[19] 3,642,347
[45] Feb. 15, 1972

Lipp

[54] IMPROVED EXTERNAL LIGHT DEFLECTION APPARATUS

[72] Inventor: James Lipp, Poughkeepsie, N.Y.
[73] Assignee: International Business Machines Corporation, Armonk, N.Y.
[22] Filed: Dec. 30, 1970
[21] Appl. No.: 102,574

[52] U.S. Cl............................350/150, 350/152, 350/160, 350/DIG. 2
[51] Int. Cl.................................................G02f 1/26
[58] Field of Search..........350/147, 150, 152, 157, 160–161, 350/DIG. 2, 288; 317/258; 174/17, 17.06

[56] References Cited

UNITED STATES PATENTS 3,481,661  12/1969  Harris......................................350/150

*Primary Examiner*—David Schonberg
*Assistant Examiner*—Paul R. Miller
*Attorney*—Hanifin and Jancin and Thomas F. Galvin

[57] ABSTRACT

Light deflection apparatus, operative under electro-optic control, employing a birefringent deflecting element in spaced-apart, parallel, substantially coextensive relationship with an isotropic alignment element and including a refractive index-matching liquid filling the space between the birefringent and isotropic elements. The preferred liquid, a polychlorinated polyphenyl oil, has a tendency to break down when exposed to high potentials generated in the electro-optic switches. To eliminate the breakdown, the liquid is confined between the birefringent and isotropic elements within a container and insulated from the switching voltages. The container structure includes adjustment means for precisely varying the distance and angle of the isotropic element with respect to the birefringent element.

12 Claims, 3 Drawing Figures

PATENTED FEB 15 1972　　　　　　　　　　3,642,347
FIG. 1
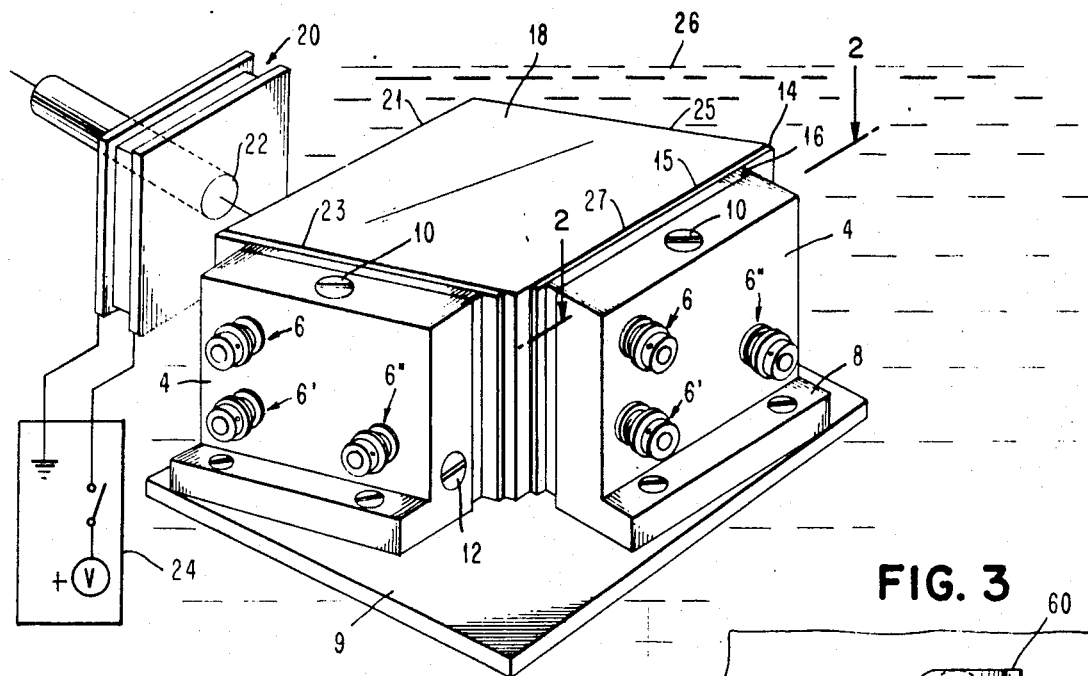
FIG. 3
FIG. 2
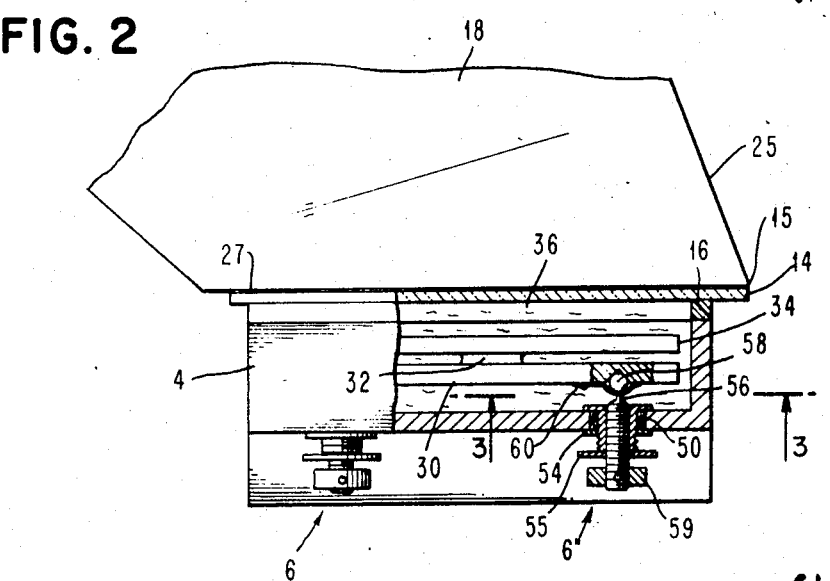
INVENTOR
JAMES LIPP
BY *Thomas F. Galvin*
AGENT

IMPROVED EXTERNAL LIGHT DEFLECTION APPARATUS

CROSS-REFERENCE TO A RELATED APPLICATION

This application incorporates by reference application Ser. No. 815,240, filed Apr. 7, 1969, now U.S. Pat. No. 3,584,933, entitled "Light Deflection Apparatus" by Habegger, et al., and assigned to the assignee of the present application.

BACKGROUND OF THE INVENTION

1. Field of the Invention

This invention relates to light deflection systems in which polarized light is selectively deflected by means of a birefringent element and an associated isotropic element.

2. Description of the Prior Art

In U.S. Pat. No. 3,481,661 to Harris and in application Ser. No. 814,240, filed Apr. 7, 1969 to Habegger, et al., both assigned to the same assignee as the instant application, there are described light deflection systems, each stage of which comprises polarization rotation means and a light deflection element consisting of a thin birefringent plate disposed in a predetermined position with respect to an incident light beam and a thin isotropic alignment plate. All of the elements of a deflection stage are located in predetermined positions in an index-matching medium so that all possible light beams traverse the same refractive index, thereby eliminating boundary refractions.

In both of these prior art systems it is contemplated that a chlorinated diphenyl oil will be used as the index-matching liquid. As contemplated in these prior art systems, and as illustrated in FIG. 1 of U.S. Pat. No. 3,481,661, the entire light deflection system is immersed in a bath of the oil. Certain ones of these oils, which are marketed commercially by the Monsanto Corporation under the trademark Aroclor have properties which make them ideal for this use: they have refractive indices of around 1.65, which match the ordinary (higher) index for calcite, the preferred birefringent element in these systems; the oils are generally noncorrosive, heat resistant, and they do not undergo photolysis. However, it has been found that these particular oils undergo a physical breakdown when a very high alternating current voltage field of around 3,600 volts is applied within the oil. This will occur, for instance, when an electro-optic switch is charged up for a stage of a light deflection system using visible or infrared radiation. In fact, it has been observed that the oils will undergo a corona discharge when a switch is pulsed with 4,000 volts at a rate of 1 megahertz. This poor dielectric property at this relatively high voltage has hindered the commercial application of the otherwise highly desirable polychlorinated polyphenyl class of oils in light deflection systems.

It is therefore an object of this invention to employ a refractive index-matching oil which is a poor dielectric but which otherwise has good physical properties in a high-voltage light deflection system.

Another difficulty experienced in light deflection systems where the birefringent element is spaced from the isotropic element is the close tolerance required between them. In the application of Habegger, et al., Ser. No. 814,240, filed Apr. 7, 1969, now U.S. Pat. No. 3,584,933 for example, the deflection distances between the possible output beams depend on the relative spacing and angular relation between the incident faces of the birefringent and isotropic elements. Because the elements can rarely be assembled precisely enough, means are provided in that application to adjust in situ the spacing between the elements and the angle formed between them. Although the means described is quite uncomplicated and is useful in many applications, it is not suitable for extremely precise adjustments, particularly with regard to ensuring that the elements are perfectly parallel.

It is therefore another object of this invention to improve the precision of the angular and spatial adjustment between the birefringent and isotropic reflecting elements in a light deflection system.

SUMMARY OF THE INVENTION

In accordance with these and other objects, an enclosure is provided for sealing off the refractive index-matching liquid from the high-voltage fields introduced by the electro-optic switches of the light deflection system. In the preferred embodiment, the enclosure comprises a closed container, one side of which is the birefringent element. The seal between the container and the birefringent element is an adhesive which is impervious to the liquid.

The isotropic alignment element is suspended within the container in spaced-apart, parallel, substantially coextensive relationship with the birefringent element; the reflective surfaces of the elements are parallel to one another. The space between the reflective surface of the isotropic element and the nonreflective (interior) surface of the birefringent element is filled up with the liquid.

The preferred means for adjusting the spacing and angle between the reflective surfaces of the birefringent and isotropic alignment elements comprise: a support plate within the enclosure attached to the side of the isotropic element away from the birefringent element; a set of adjustment screws carried by and through the container, each screw having a generally enlarged tip for rotatable engagement in a socket formed in the support plate; and a yoke having an end attached to the support plate for holding the enlarged tip in the socket.

BRIEF DESCRIPTION OF THE DRAWINGS

FIG. 1 is a perspective view of a typical light deflection apparatus in accordance with the present invention.

FIG. 2 is a top view taken partly in section of one light deflecting section of the apparatus, taken along lines 2—2 of FIG. 1.

FIG. 3 is a plan view taken along lines 3—3 of FIG. 2 of a yoke which holds an adjustment screw in engagement with the support plate.

DESCRIPTION OF THE PREFERRED EMBODIMENT

Referring now to FIG. 1, there is shown a perspective view of a two-section light deflector, each section of which embodies the novel aspects of the present invention. Each section comprises a hollow container 4 having adjustment screws 6, 6', 6" threadably mounted therein. Base 8 of the container 4 is fixedly attached to a mounting fixture 9. Screws 10 and 12 are removable from container 4 to provide inlet and outlet ports, respectively, for a liquid which has a refractive index which is intended to match the higher refractive index of the birefringent element. Container 4 is sealed to birefringent element 14 by means of silicone seal 16 which is impervious to the liquid. The container is open-ended at its interface with birefringent element 14; hence light passing through the birefringent element will enter the interior of the container. In the preferred embodiment, container 4 is fabricated from a metal, such as aluminum, which is not attacked by the refractive index-matching liquid; and birefringent element 14 is calcite.

The birefringent elements 14 of each section of the light deflector are cemented to surfaces 23 and 27, respectively, of prism 18. The cement is optically transmissive, having an index of refraction matching that of the birefringent elements. Prism 18 is preferably a borosilicate glass having substantially the same index of refraction as the higher index of the calcite and is firmly attached to the mounting fixture 9.

Polarization control element 20 operates to rotate the polarization of incoming light from a source, such as a laser (not shown), of linearly polarized light which provides an incident beam 22 to the two-section light deflector. Surface 21 of prism 18 is perpendicular to the path of beam 22. Element 20 is preferably an electro-optic crystal such as potassium dideuterium phosphate (KD$_2$PO$_4$). It is actuated by the switching of a potential source 24 which is external to the system. This function is well known to persons skilled in electro-optic technology. After being deflected within the two-section light deflector, the beam exits from surface 25 of prism 18.

The entire assembly, excluding potential source 24, is immersed in a bath of oil 26. In prior art systems this oil is a chlorinated diphenyl which has an index of refraction which matches the ordinary (higher) index of the birefringent element. However, it has been discovered that this oil will break down when exposed to high-voltage potentials and is susceptible to corona discharge when the voltages are switched rapidly. Therefore, the oil 26 must comprise a medium which will not break down when polarization control element 20 is switched by potential 24. One oil which has been found useful is a silicone oil supplied by the Dow Corning Company under the trade name "D. C. 550 Silicone Oil."

Oil 26 does not have a refractive index corresponding to the higher index of the birefringent element 14 (around 1.65). Rather, it has a refractive index, around 1.5, which matches the index of the exterior surfaces of the polarization control element 20. In order to avoid reflection losses or refraction at the prism-oil interface, surface 21 of prism 18 which receives light 22 passing through control element 20, is set normal to the direction of the light.

Prism 18 performs two functions in this invention. It serves primarily as a means for providing a nonrefracting path for the incident light beam 22 between oil 26 and birefringent element 14. Secondarily, it firmly supports the birefringent elements.

It will be readily apparent that prism 18 need not be solid throughout. Instead, the prism might be hollow, having the same outer geometry, and filled with a liquid having a refractive index which corresponds to the higher refractive index of birefringent element 14.

In FIG. 2 there is shown a top view of a single section of the two-section light deflector. It will be understood that the description of one section is the same as the description of the other section so that a detailed description of both is unnecessary. As may be seen, container 4 is hollow and contains suspended therein a support plate 30 having an arm of reduced thickness 32 affixed to isotropic alignment element 34. The arm is preferably attached at the center of the surfaces of the support plate and isotropic element. The oil 36, which has poor dielectric properties when exposed to a high voltage from the polarization switches, substantially fills the space within the housing which is not taken up by the support plate and the isotropic element. The open-ended container 4 is mounted around its periphery to the birefringent element 14 by means of a seal 16. Seal 16 must be of the type which is nonreactive to the liquid and in this embodiment is composed of a silicone rubber. The seal is cemented to the calcite plate and to container 4 by means of an adhesive (not illustrated) which is also not affected by the liquid.

It will be noted at this point that oil 36 is completely insulated within the container from external effects.

The preferred adjustment means whereby the isotropic alignment element 34 is spatially and angularly adjusted with respect to the fixed birefringent element 14 comprises three screws 6, 6' and 6" which are carried through the side of container 4 opposite the birefringent element. The tip of each screw engages a recessed socket in support plate 30 and is held in the socket by a yoke fixture 60 affixed to the plate. The socket may be conical or spherical in shape. It will be noted in FIG. 1 that the adjustment screws are positioned to form a right triangle, the advantages of which will be described below.

Referring now to the adjustment means in specific detail, the adjustment screw 6" is held in container 4 by means of a bushing 50 which preferably comprises a hollow brass screw threaded internally and externally. The bushing is cemented to the interior of container 4. Locknut 54 is threaded on the external threads of bushing 50 and serves to firmly hold the bushing in place. Adjustment screw 6" is threadably engaged by the internal threads of bushing 50. Knob 59 is removable from the stem of the screw for ease of assembly. The end of the screw within the container comprises a neck 56 having attached thereto an enlarged, generally spherical, tip 58. Tip 58 fits into the socket formed in support plate 30. Fixture 60, a leaf spring, holds tip 58 in the socket. The leaf spring is fabricated from metal which is not attacked by liquid 36. In this embodiment the spring is fabricated from Be-Cu. After the screw is adjusted to its final position, checknut 55 is threaded around the threads of screw 6' until it is seated against bushing 50. This serves to lock the screw in place.

FIG. 3 shows the flat surface of leaf spring 60 as having the shape of a yoke. As may be seen, the gap between the yoke arms is greater than the diameter of screw neck 56 but less than the diameter of tip 58. The end of leaf spring 60 distal from the yoke arms is affixed to the support plate at 61. By using this means for engaging the adjustment screws 6, 6' and 6" with support plate 30, the reactive load on the assembly is practically negligible, being in the order of grams. Hence, the alignment element 34 will be essentially free of stress during the adjustment steps and will remain so after the steps are completed.

Knob 59 is removable from the stem of screw 6" because of the preferred method of assembling the adjustment means. In the assembling operation, each of the stems of screws 6, 6' and 6" are first engaged in their corresponding sockets and yokes at support plate 30. The screw stems are then inserted from the interior of container 4 through their corresponding bushings to the exterior. Checknut 55 is threaded a few turns and knob 59 is then fitted on the stem of screw 6" (a similar operation is performed for screws 6 and 6'). The spatial and angular adjustments are then made as previously described above. Checknut 55 is tightened onto bushing 50 of screw 6" (similarly for screws 6 and 6") and the assembly is complete.

Besides avoiding undue stress on the alignment element, the particular adjustment mechanism shown is capable of deflecting desired angular and spatial adjustments between the isotropic element and the calcite element with great accuracy. In FIG. 1 it will be seen that the adjustment screws 6, 6' and 6" are arranged orthogonally with respect to one another rather than equilaterally. In other words, the screws 6, 6' and 6" can be envisioned as forming a right triangle at apex 6' in the plane of the container surface. This design has the important advantage of eliminating cross-coupling when adjusting the alignment element 34 axially with respect to birefringent element 14 (FIG. 2). In a practical situation, adjustment screw 6' will be set so that the distance between elements 14 and 34 at the point of screw 6' is the distance desired. If screw 6" is then adjusted, element 34 will rotate about the axis formed by screws 6–6". There will be no cross-coupling between screws 6 and 6". With screw 6" set at the desired distance, screw 6 is adjusted and element 34 will rotate about axis 6' and 6" until a parallel relationship with element 14 is obtained. Tedious readjusting is thereby avoided.

OPERATION

The general operation of the two-section light-deflecting element shown in FIG. 1 is the same as is described in IBM Docket P09–68–045 which was filed on Apr. 7, 1969 having Ser. No. 814,240 and entitled "Light Deflection Apparatus;" which application is herein incorporated by reference. In particular, FIG. 5 of that application and the specification relating thereto shows the general operation of a two-section light deflector as shown in FIG. 1 of the present application. Each of the sections shown in FIG. 1 comprises an isotropic element 34 which is adjustable angularly and spatially with respect to a birefringent element 14. The sections are arranged at an obtuse angle with respect to one another.

The polarized light transmitted through surface 21 of prism 18 is incident on the birefringent element of the left-hand section of the deflector. The birefringent element will deflect beam 22 at its incident face into a first path when the beam has one of two mutually orthogonal polarization states and will transmit the beam to the alignment element for deflection into a second path when the beam has the other of the polarization states. The birefringent element of the second section is arranged in both of these paths. It transmits a beam in the first path to the alignment element of the second section. The alignment element redeflects this beam out of prism 18 through surface 25 to a first selected location. The birefringent element will redeflect a beam in the second path out of the prism to a second selected location. The deflection that occurs and the position between the possible output beams depends on the polarization of the beam and on the distances between the incident face of the birefringent element and the incident face of its associated alignment element. This distance is required to be the same for both stages. A more detailed explanation of this operation is given in the above application incorporated herein by reference.

The polychlorinated polyphenyl oils preferably used in light deflection systems of the type described are clear, mobile oils which have a refractive index corresponding to the higher index of the birefringent element. The Monsanto Corporation supplies these oils under the trademark Aroclor. The particular compound used in the present system is termed "Aroclor 1248," which has a refractive index of 1.63.

As already noted, these oils do not have sufficiently good dielectric properties to withstand repeated high-voltage switching. This defect is overcome in the present invention by insulating the oil from the high-voltage, confining it between the birefringent and isotropic elements. Another liquid medium 26 having a high resistivity to voltage breakdown is used in areas exposed to the voltages. The refractive index of this oil need not match the index of the birefringent element but should match the refractive index of the polarization switches and split-angle devices between the various stages of a complete deflection system. A silicone oil having a refractive index of around 1.5 is suitable.

While the invention has been particularly shown and described with reference to a preferred embodiment thereof, it will be understood by those skilled in the art that various changes in form and detail may be made therein without departing from the spirit and scope of the invention. For example, the invention is applicable for use with any liquid which is useful in light deflection systems but which is susceptible to high-voltage breakdown. In addition, it is extendable to each stage of a complete light deflection system.

What is claimed is:

1. In a light deflector for selectively deflecting a polarized light beam having a given one of two linear polarization directions, including: birefringent means having an incident surface for reflecting a light beam of a first linear polarization direction and passing a light beam of a second linear polarization direction, isotropic alignment means having a reflective surface in spaced-apart, parallel, substantially coextensive relationship with the incident surface of the birefringent means, and a liquid having an index of refraction corresponding to the refractive index of the birefringent means, said first liquid having poor dielectric properties, the improvement comprising:
means for confining the liquid between the birefringent and alignment means and for insulating the liquid from voltages applied externally to the confining means.

2. A light deflector as in claim 1 wherein:
the alignment means and the birefringent means are thin plates;
the confining means comprises a closed container, one side of which is formed by the birefringent plate;
the alignment plate is suspended within the container; and
the space between the plates is filled up with liquid.

3. A light deflector as in claim 2 further comprising means for adjusting the alignment plate spatially and angularly with respect to the birefringent plate.

4. A light deflector as in claim 3 wherein the adjustment means comprises:
a support plate having a surface affixed to the surface of the alignment plate away from the birefringent plate;
a plurality of screw means threaded through the surface of the container and into the container opposite the container surface formed by the birefringent plate; and
means for rotatably engaging each screw means with the support plate, whereby rotation of the screw means affects the spatial and angular relationship between the alignment plate and the birefringent plate.

5. A light deflector as in claim 4 wherein the screw means are three in number and are disposed orthogonally with respect to each other, thereby substantially eliminating cross-coupling between the screw means when the alignment plate is being aligned with the birefringent plate.

6. A light deflector as in claim 4 wherein each screw means includes:
an enlarged portion formed on the end within the container, for engagement by the means for rotatably engaging the screw means.

7. A light deflector as in claim 6 wherein the means for rotatably engaging each screw means comprises:
a socket formed in the support plate for receiving the enlarged portion of the screw means; and
a yoke having a gap for receiving the elongated portion of the screw means, said gap having a diameter less than the diameter of the enlarged portion of the screw means, the end of the yoke distal from the gap being affixed to the support plate.

8. Light deflection apparatus for selectively deflecting a polarized light beam comprised of:
polarization control means for selectively controlling the polarization of the light beam;
first liquid means for providing a nonrefracting path for the light beam as propagated by the polarization control means, said first liquid having good dielectric properties for withstanding voltages developed by the control means and having an index of refraction corresponding to the refractive index of the control means;
a two-section light deflector for selectively deflecting the light beam propagated by the control means, each section comprising:
birefringent means having an incident surface disposed to encounter an incident light beam;
isotropic alignment means having a reflective surface in spaced-apart parallel, substantially coextensive relationship with the incident surface of the birefringent means;
a second liquid having an index of refraction corresponding to the refractive index of the birefringent means, said second liquid having poor dielectric properties;
means for confining the second liquid between the birefringent and alignment means and for insulating the second liquid from voltages applied to the polarization control element;
the birefringent means of the first section being disposed to encounter a light beam from the polarization control element for deflecting the beam at its incident face into a first path when the beam has one of two mutually orthogonal polarization states and for transmitting a beam to the alignment means for deflection into a second path when the beam has the other of said mutually orthogonal polarization states;
the birefringent means of the second section being arranged in both of the first and second paths for transmitting the beam in the first path for redeflection by the alignment means of the second section to one of two selected locations and for redeflecting the beam in the second path at its incident face to the other of said selected locations; and
means for providing a nonrefracting path for the propagated light beam between the first liquid means and the two-section light deflector.

9. Light deflection apparatus as in claim 8 wherein the means for providing a nonrefracting path between the first liquid means and the two-section light deflector is a transparent body having a first surface disposed normal to the propagated light beam, second and third surfaces abutting the incident surfaces of the birefringent means of the first and second sections of the two-section light deflector, respectively, and a fourth surface for transmitting light deflected by the two-section light deflector.

10. Light deflector apparatus as in claim 9 wherein the means for providing a nonrefracting path between the first liquid means and the two-section light deflector is a solid prism having a refractive index corresponding to the refractive index of the birefringent means.

11. Light deflection apparatus as in claim 9 wherein the means for providing a nonrefracting path between the first liquid means and the two-section light deflector is a substantially hollow prism, the hollow portion being filled with a liquid having a refractive index corresponding to the refractive index of the birefringent means.

12. Light deflection apparatus as in claim 8 further comprising means for adjusting each alignment means spatially and angularly with respect to its associated birefringent means.

* * * * *

PO-1050
(5/69)

UNITED STATES PATENT OFFICE
CERTIFICATE OF CORRECTION

Patent No. 3,642,347 (102574)   Dated February 15, 1972

Inventor(s) James Lipp

It is certified that error appears in the above-identified patent and that said Letters Patent are hereby corrected as shown below:

In the Title --REFLECTION-- should be inserted between "EXTERNAL" and "LIGHT". Title should read "IMPROVED EXTERNAL REFLECTION LIGHT DEFLECTION APPARATUS".

Signed and sealed this 8th day of August 1972.

(SEAL)
Attest:

EDWARD M. FLETCHER, JR.           ROBERT GOTTSCHALK
Attesting Officer                 Commissioner of Patents